(12) United States Patent
Poertner et al.

(10) Patent No.: US 10,293,635 B2
(45) Date of Patent: *May 21, 2019

(54) BICYCLE RIM

(71) Applicant: SRAM, LLC, Chicago, IL (US)

(72) Inventors: Joshua Poertner, Carmel, IN (US); Michael Hall, Carmel, IN (US)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,204

(22) Filed: Apr. 27, 2017

(65) Prior Publication Data

US 2017/0225510 A1    Aug. 10, 2017

Related U.S. Application Data

(63) Continuation of application No. 12/775,473, filed on May 7, 2010, now Pat. No. 9,656,516.

(51) Int. Cl.
| | |
|---|---|
| *B60B 21/02* | (2006.01) |
| *B60B 1/04* | (2006.01) |
| *B60B 5/02* | (2006.01) |
| *B60B 1/00* | (2006.01) |

(52) U.S. Cl.
CPC ............ *B60B 21/025* (2013.01); *B60B 1/003* (2013.01); *B60B 1/043* (2013.01); *B60B 5/02* (2013.01); *B60B 21/02* (2013.01); *B60B 21/021* (2013.01); *B60B 21/028* (2013.01); *B60B 2360/341* (2013.01); *B60B 2900/1216* (2013.01); *Y02T 10/88* (2013.01)

(58) Field of Classification Search
CPC .. B60B 1/02; B60B 1/04; B60B 1/041; B60B 1/0143; B60B 21/00; B60B 21/02; B60B 21/025; B60B 21/06

See application file for complete search history.

(56) References Cited

U.S. PATENT DOCUMENTS

| | | | | |
|---|---|---|---|---|
| 5,061,013 | A | * | 10/1991 | Hed ........................ B60B 1/003 301/104 |
| 5,975,645 | A | * | 11/1999 | Sargent ................... B60B 1/003 301/55 |
| 6,068,347 | A | * | 5/2000 | Okajima ................ B60B 1/0223 301/104 |
| 6,145,936 | A | | 11/2000 | Alberti et al. |
| 6,145,937 | A | | 11/2000 | Chen |
| 6,158,819 | A | | 12/2000 | Okajima et al. |

(Continued)

FOREIGN PATENT DOCUMENTS

| | | |
|---|---|---|
| CN | 101554827 | 10/2009 |
| DE | 10136345 | 2/2003 |

(Continued)

*Primary Examiner* — Jason R Bellinger (57) ABSTRACT

A rim for a bicycle wheel that includes a tire, hub and spokes. The bicycle rim generally includes a radially outer tire-engaging portion, a radially inner spoke-engaging portion, a first sidewall and a second sidewall spaced apart from the first sidewall. The first and second sidewalls extend between the tire engaging and spoke-engaging portions. The tire-engaging and spoke-engaging portions and first and second sidewalls form a toroid. The rim when attached to the tire forms a side profile and a transverse cross section that positions a center of pressure of the rim.

13 Claims, 7 Drawing Sheets

(56) References Cited

U.S. PATENT DOCUMENTS

| | | | |
|---|---|---|---|
| 6,231,128 B1 | 5/2001 | Okajima et al. | |
| 6,991,298 B2 | 1/2006 | Ording et al. | |
| 8,342,614 B2 * | 1/2013 | Poertner | B60B 5/02 |
| | | | 301/95.102 |
| 9,656,516 B2 * | 5/2017 | Hall | B60B 5/02 |
| 2003/0107260 A1 | 6/2003 | Ording et al. | |
| 2007/0069572 A1 | 3/2007 | Chen | |
| 2008/0174168 A1 | 7/2008 | Yang | |
| 2011/0273000 A1 | 11/2011 | Hall et al. | |

FOREIGN PATENT DOCUMENTS

| | | |
|---|---|---|
| TW | I272196 | 2/2007 |
| WO | 9718098 | 5/1997 |

\* cited by examiner

BICYCLE RIM

This application is a continuation of U.S. patent application Ser. No. 12/775,473, filed May 7, 2010, now U.S. Pat. No. 9,656,516, which is herein referenced in its entirety.

BACKGROUND OF THE INVENTION

The present invention relates to bicycle rims, and more particularly to a toroidal bicycle rim having a maximum width disposed closer to a spoke-engaging portion than a tire-engaging portion of the rim.

As a bicycle travels through the air, unwanted turbulence is generated around the bicycle wheel creating drag which acts against the bicycle's forward motion. Further, the bicycle's forward motion may be hindered by crosswinds causing the bicycle to lean.

SUMMARY OF THE INVENTION

In an embodiment, a rim for a bicycle wheel having a tire, hub and spokes is provided. The rim generally includes a tire-engaging portion, and a spoke-engaging portion disposed radially inward of the tire engaging portion. The rim also includes a first sidewall, and a second sidewall spaced apart from the first sidewall, the first and second sidewalls extending between the tire-engaging and spoke-engaging portions. The tire-engaging portion, the spoke-engaging portion, the first sidewall, and the second sidewall form a toroid in a transverse cross section of the rim. The rim when attached to the tire forms a side profile and the transverse cross section may position a center of pressure on the side profile rearward of a steering axis of the rim. Alternatively, or additionally, the center of pressure may be positioned below the steering axis. Alternatively, or additionally, a maximum width of the rim may be disposed closer to the spoke-engaging portion than the tire-engaging portion.

These and other features and advantages of the present invention will be more fully understood from the following description of one or more embodiments of the invention, taken together with the accompanying drawings.

DETAILED DESCRIPTION

Figure 1:
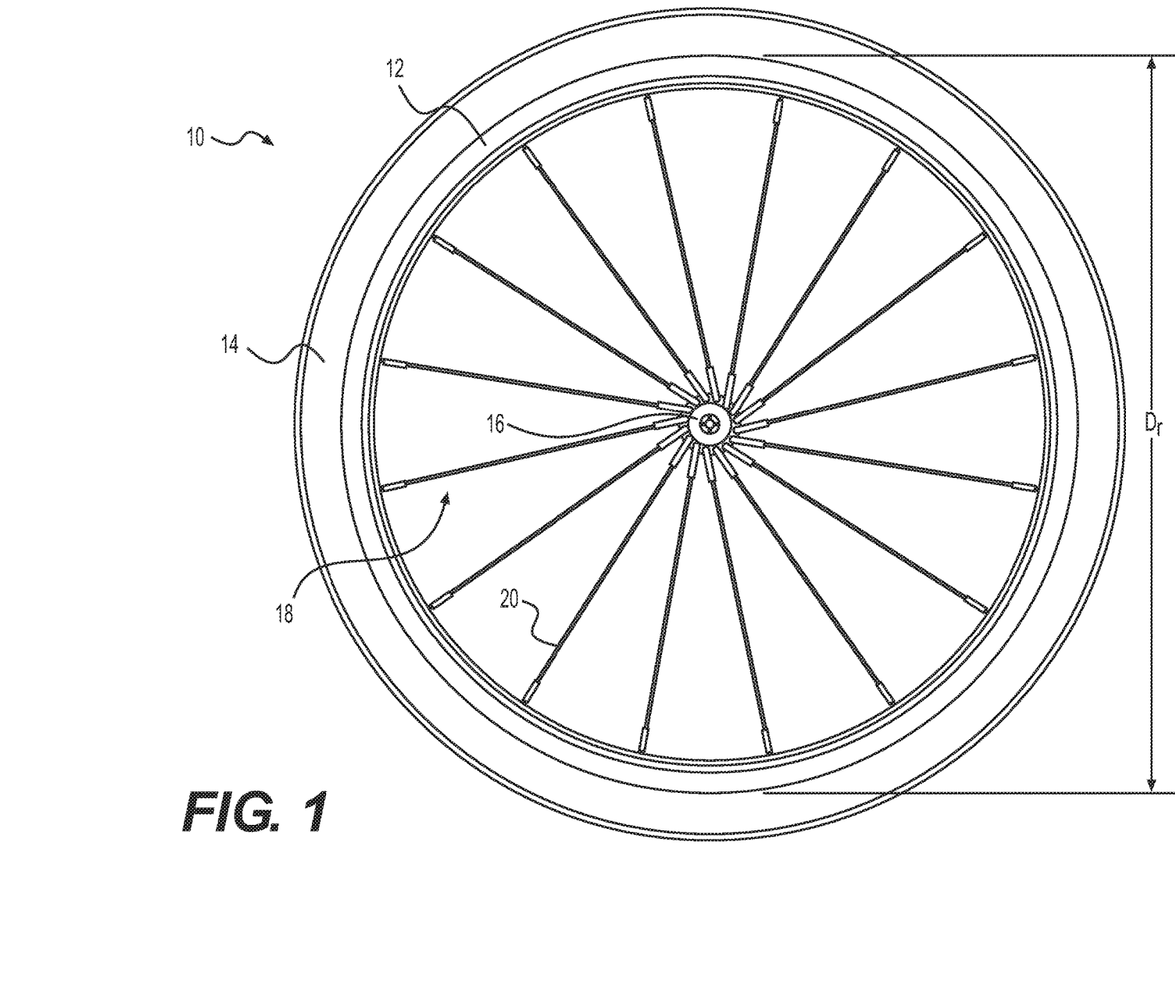
FIG. 1 is a side view of a metal-spoked bicycle wheel.
Figure 2:
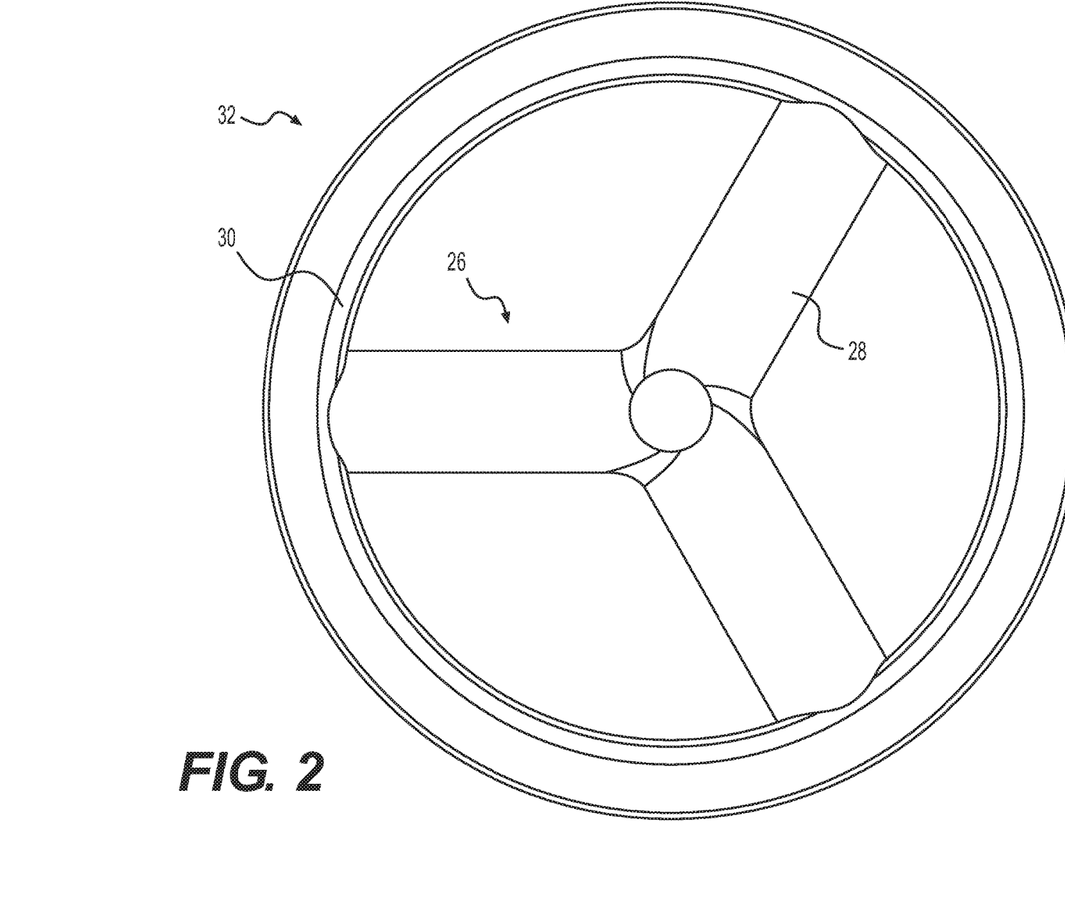
FIG. 2 is a side view of a three-spoked bicycle wheel.
Figure 3:
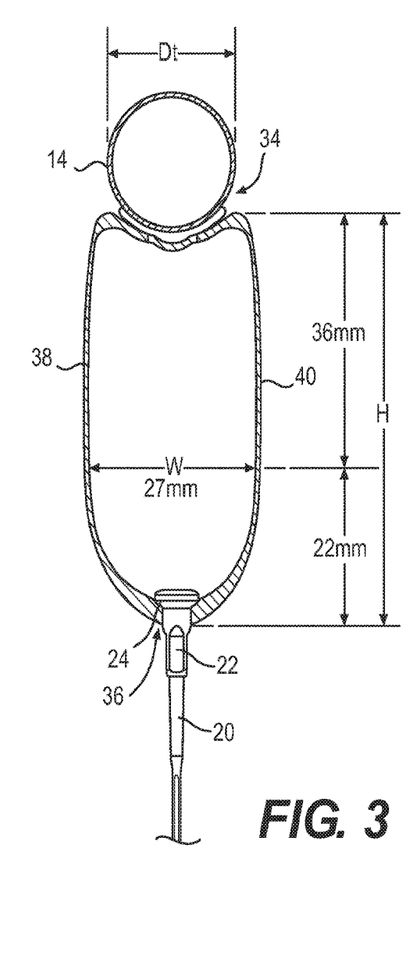
FIG. 3 is a cross-sectional view of a tubular rim, tire and a metal spoke.
Figure 5:
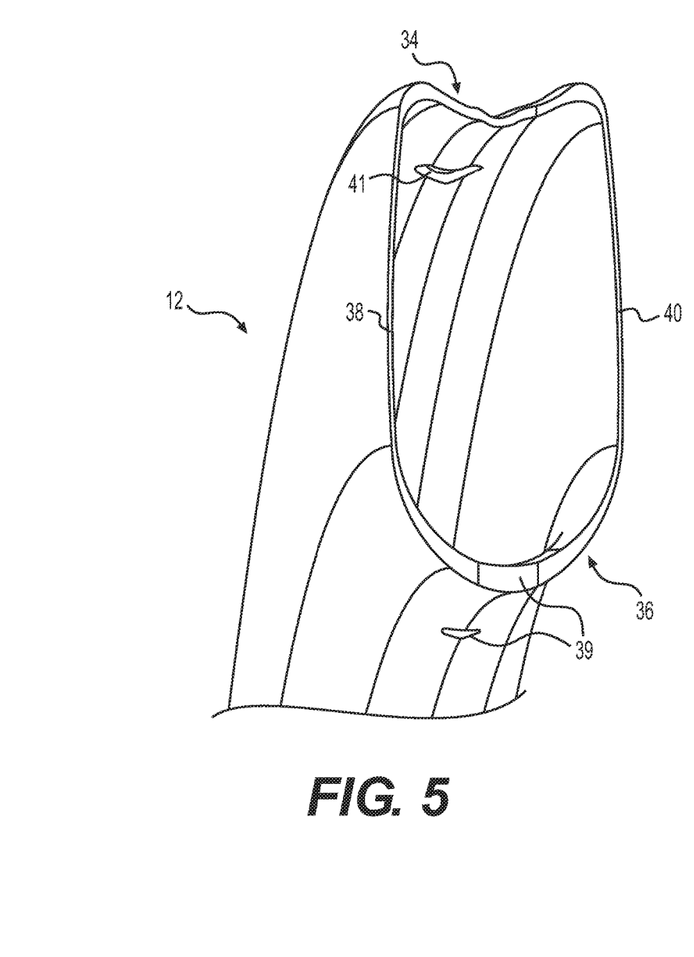
FIG. 5 is a perspective cross-sectional view of the tubular rim of FIG. 3.

FIGS. 1, 3 and 5 illustrate a bicycle wheel 10 including a toroidal rim 12, a tire 14, a hub 16 and a spoke system 18. The hub 16 is mounted to a frame of the bicycle (not shown). The spoke system 18 includes a plurality of metal spokes 20, typically about thirty-two to thirty-six spokes. Looking to FIG. 3, the spoke 20 includes a threaded end 22 and a nipple 24 to secure the spoke 20 to the rim 12. Alternatively, a spoke system 26 may include three composite spokes 28 molded into a rim 30 of a bicycle wheel 32 (see FIG. 2).

The wheel 10 shown in FIGS. 1, 3 and 5 is a tubular or sew-up type wheel wherein the tire 14 is glued to the rim 12. The rim 12 generally includes a radially outer tire-engaging portion 34, a radially inner spoke-engaging portion 36, a first sidewall 38 and a second sidewall 40 spaced apart from the first sidewall 38. The first and second sidewalls 38, 40 extend between the tire-engaging 34 and spoke-engaging portion 36. The tire 14 is glued to the tire-engaging portion 34 of the rim 12. The spoke-engaging portion 36 includes a plurality of first openings 39 for receiving the threaded ends 22 of the spokes 20 therethrough. The tire-engaging portion 34 includes a plurality of second openings 41 aligned with the plurality of first openings 39 for receiving a tool to tighten the nipples 24 on the threaded ends 22 of the spokes 20 to secure the spokes 20 to the rim 12. The tire-engaging and spoke-engaging portions 34, 36 and first and second sidewalls 38, 40 form a toroid.

Figure 4:
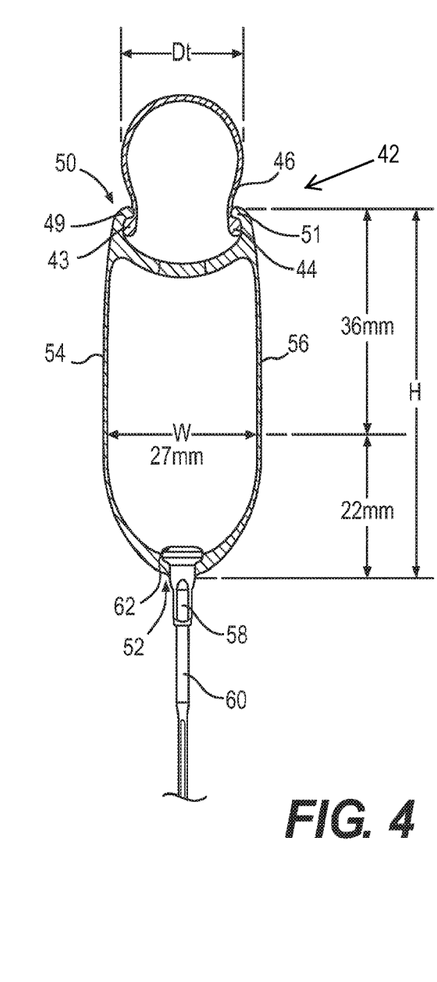
FIG. 4 is a cross-sectional view of a clincher rim, tire and a metal spoke.
Figure 6:
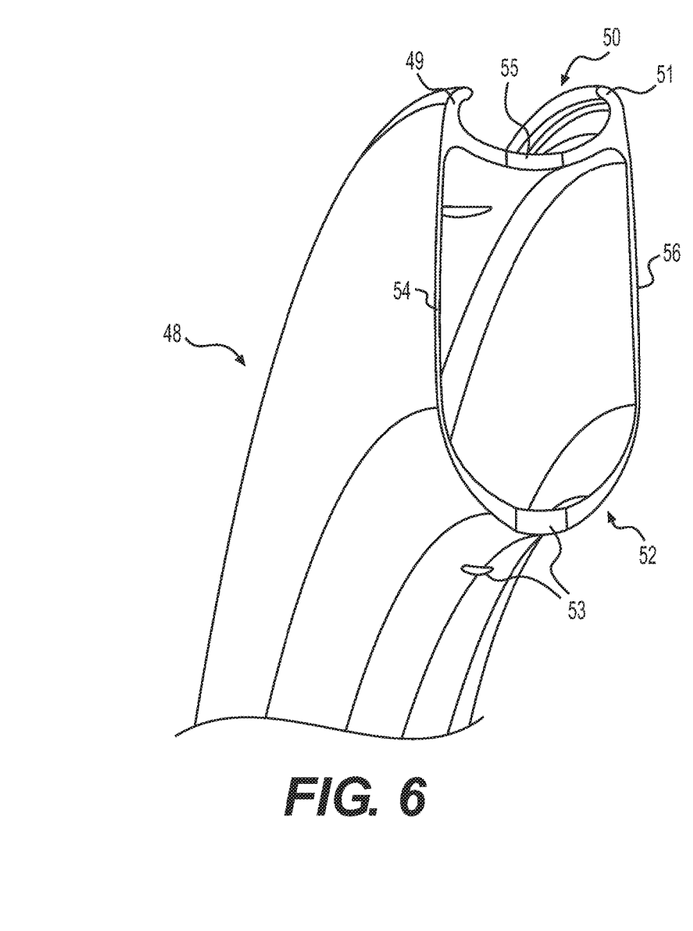
FIG. 6 is a perspective cross-sectional view of the clincher rim of FIG. 3.

Another type of wheel is shown in FIGS. 4 and 6, a clincher wheel 42, wherein beads 43, 44 of a tire 46 are clinched onto a rim 48. The rim 48 generally includes a radially outer tire-engaging portion 50, a radially inner spoke-engaging portion 52, a first sidewall 54 and a second sidewall 56 spaced apart from the first sidewall 54. The first and second sidewalls 56, 54 extend between the tire-engaging and spoke-engaging portion 50, 52. The tire-engaging portion 50 includes a pair of circumferential bead engaging members 49, 51 for engaging the beads 43, 44 of the tire 46. The spoke-engaging portion 52 includes a plurality of first openings 53 for receiving threaded ends 58 of spokes 60 therethrough. The tire-engaging portion 50 includes a plurality of second openings 55 aligned with the plurality of first openings 53 for receiving a tool to tighten nipples 62 on the threaded ends 58 of the spokes 60 to secure the spokes 60 to the rim 48. The tire-engaging and spoke-engaging portions 50, 52 and first and second sidewalls 54, 56 form a toroid.

As used herein, toroid or toroidal means a surface generated by a plane closed curve rotated about a line that lies in the same plane as the curve but does not intersect it. The plane closed curve of the toroid may take on any shape. Looking to FIGS. 5 and 6, the plane closed curve which generates the form of the toroidal rim 12 and 48, respectively, is substantially an ellipse which has been modified to provide a concave end at the tire-engaging portions 34, 50, respectively. Looking to FIGS. 3 and 4, the major and minor cross-sectional dimensions of the toroidal rims 12, 48 define an aspect ratio. The aspect ratios of the rims 12, 48 are the ratio of the rim heights H to the rim widths W. The rim height H is defined as the maximum vertical rim dimension when the rim is oriented perpendicular to a horizontal plane. The rim width W is the maximum horizontal dimension when the rim is oriented perpendicular to a horizontal plane. The toroidal rim and tire mounted thereto may form a substantially elliptical cross section and the rim has an aspect ratio ranging from 1.5 to 5. In the embodiments shown, the rims 12, 48 have a maximum height H of 58 mm and a maximum width W of 27 mm, thus forming an aspect ratio of 2.15. Preferably, the rim height H is greater than 40 mm or greater than 7% of the rim diameter Dr. To improve the aerodynamic efficiency, the ratio of the maximum rim width W to the tire diameter Dt is in the range from about 1.05 to about 1.25.

Figure 7:
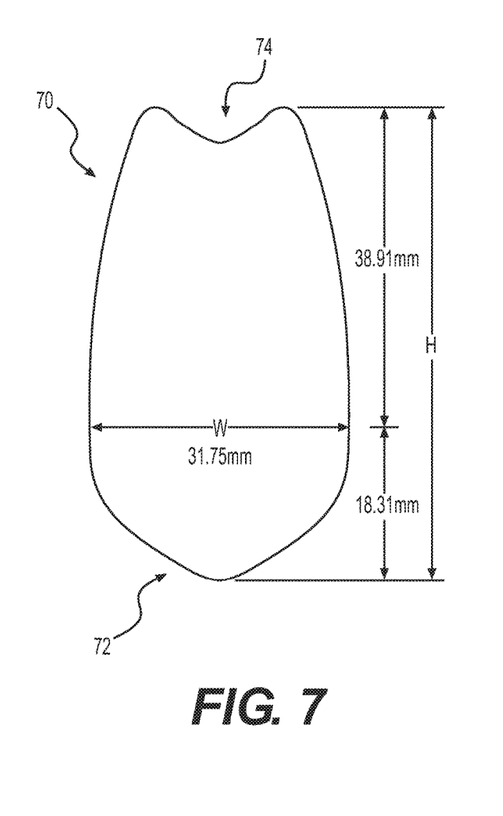
FIG. 7 is a schematic cross-sectional view of a rim according to another embodiment of the present invention.
Figure 8:
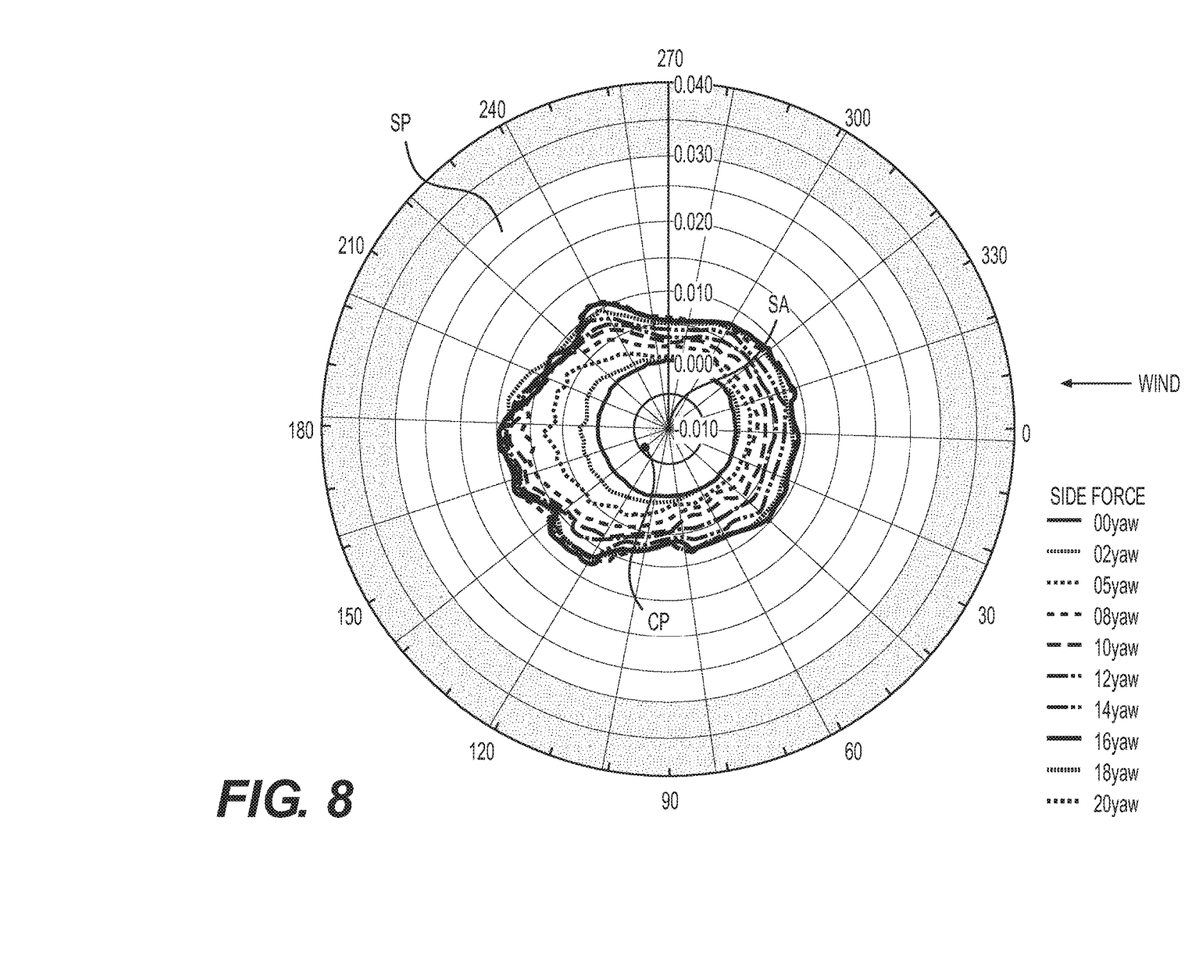
FIG. 8 is a CFD force diagram of a rim having a height of 58 mm.
Figure 9:
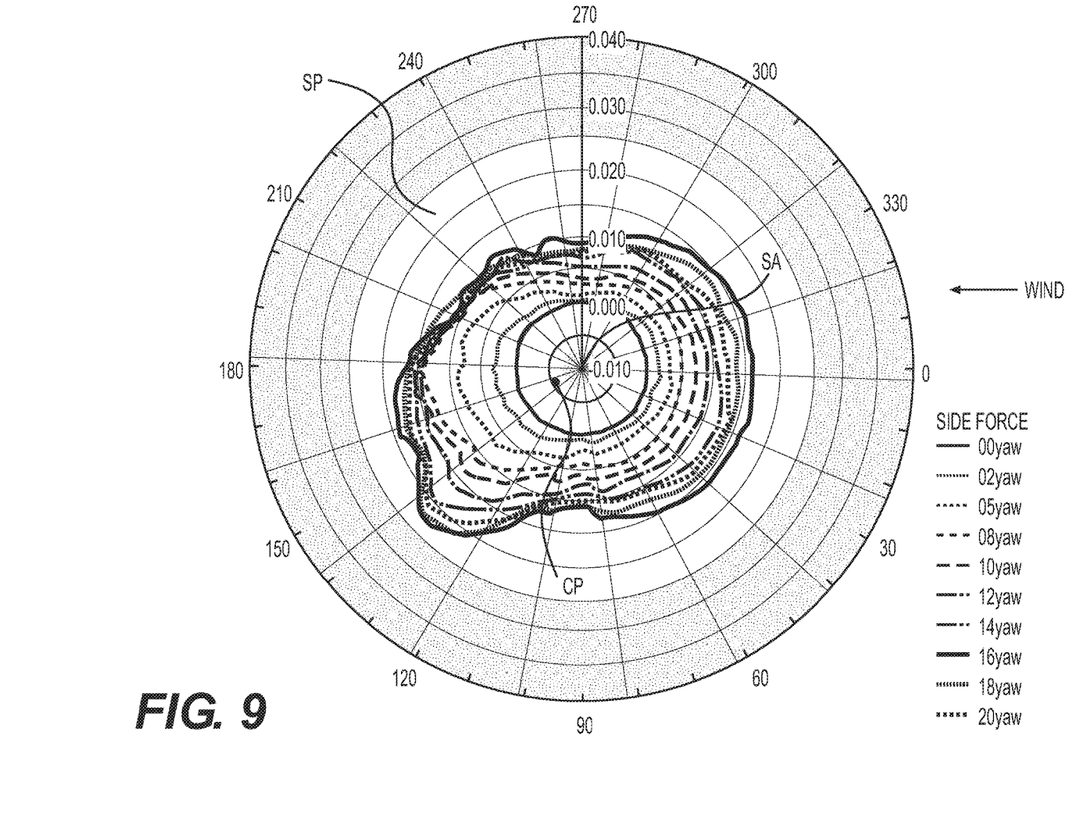
FIG. 9 is a CFD force diagram of a rim having a height of 81 mm.

The maximum width W of the toroidal rims 12, 48 is disposed closer to the spoke-engaging portions 36, 52 than the tire-engaging portions 34, 50. In FIGS. 3 and 4, the maximum width W is disposed 22 mm from the end of the rim. FIG. 7 shows an alternative rim 70 having a toroidal shape with an aspect ratio of 1.8 (W=31.75 mm, H=57.22) and the maximum width W is disposed closer to a spoke-engaging portion 72 than a tire-engaging portion 74 of the rim 70. FIGS. 8 and 9 are Computational Fluid Dynamic (CFD) force diagrams showing side forces on rims having heights of 58 mm and 81 mm, respectively. In the rims of FIGS. 8 and 9, the center of pressures CP induced by crosswinds are disposed behind and below the steering axis SA of the wheel (and by extension, the rim), or the axis of hub 16. The rearward center of pressure makes the wheel want to steer into the wind and the low center of pressure reduces the leverage of the wind on the bicycle lean angle, each of the rearward and lower centers of pressure contributing to an inherently more stable wheel and improving aerodynamic efficiency.

The toroidal rims 14, 48 are made of a composite material. Further, the interior of the rims may be solid, hollow, filled or reinforced as desired to obtain the desired strength, weight and cost.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A rim for a bicycle, the rim configured to attach to a tire and spokes of a bicycle wheel, the bicycle rim comprising:
    a tire-engaging portion;
    a spoke-engaging portion disposed radially inward of the tire engaging portion;
    a first sidewall; and
    a second sidewall spaced apart from the first sidewall, the first and second sidewalls extending between the tire-engaging and spoke-engaging portions;
    the tire-engaging portion, the spoke-engaging portion, the first sidewall, and the second sidewall forming a toroid in a transverse cross section of the rim,
    wherein the rim when attached to the tire forms a side profile and the transverse cross section positions a center of pressure on the side profile rearward of a steering axis of the rim.

2. The rim of claim 1, wherein the tire engaging portion and a spoke opening of the spoke-engaging portion are disposed in opposing sides of the toroid.

3. The rim of claim 1, wherein the transverse cross section formed by the rim and the tire mounted thereto is substantially elliptical in shape with the tire-engaging portion and the spoke-engaging portion forming opposing ends of the substantially elliptical shape.

4. The rim of claim 1, wherein a ratio of the maximum height of the rim to the maximum width of the rim ranges from 1.5 to 5.

5. The rim of claim 1, wherein a maximum height of the rim is greater than 40 millimeters.

6. The rim of claim 1, wherein a maximum height of the rim is greater than 7% of a diameter of the rim.

7. The rim of claim 1, wherein the transverse cross section positions the center of pressure on the side profile rearward and below a steering axis of the rim.

8. A rim for a bicycle configured for use with a tire, hub and spokes, the bicycle rim comprising:
    a tire-engaging portion;
    a spoke-engaging portion disposed radially inward of the tire engaging portion;
    a first sidewall; and
    a second sidewall spaced apart from the first sidewall, the first and second sidewalls extending between the tire-engaging and spoke-engaging portions;
    the tire-engaging portion, the spoke-engaging portion, the first sidewall, and the second sidewall forming a toroid in a transverse cross section of the rim,
    wherein the rim when attached to the tire forms a side profile and the transverse cross section positions a center of pressure on the side profile below a steering axis of the rim.

9. The rim of claim 8, wherein when the tire is attached to the tire-engaging portion, the rim and wheel transverse cross section is substantially elliptical in shape and the tire-engaging portion and the spoke-engaging portion form opposing ends of the elliptical shape.

10. The rim of claim 8, wherein a ratio of a maximum height of the rim to a maximum width of the rim ranges from 1.5 to 5.

11. The rim of claim 8, wherein a height of the rim is greater than 40 millimeters.

12. The rim of claim 8, wherein a maximum height of the rim is greater than 7% of a diameter of the rim.

13. The rim of claim 8, wherein the transverse cross section positions the center of pressure on the side profile below and rearward of a steering axis of the rim.

* * * * *